United States Patent [19]

Hijiya et al.

[11] 3,870,537

[45] Mar. 11, 1975

[54] SHAPED SOLID BODY OF PULLULAN ETHER AND METHODS OF MAKING AND USING THE SAME

[75] Inventors: Hiromi Hijiya; Makoto Shiosaka, both of Okayama, Japan

[73] Assignee: Hayashibara Biochemical Laboratories, Incorporated, Okayama, Japan

[22] Filed: Feb. 25, 1974

[21] Appl. No.: 445,092

[30] Foreign Application Priority Data
Mar. 1, 1973 Japan.............................. 48-23710

[52] U.S. Cl..................... 106/162, 195/31, 260/209
[51] Int. Cl. ....................... C08b 25/00, C08b 27/42
[58] Field of Search ........ 106/162; 195/31; 260/209

[56] References Cited
UNITED STATES PATENTS
3,784,390   1/1974   Hijiya et al. ....................... 106/213

*Primary Examiner*—Theodore Morris
*Attorney, Agent, or Firm*—Hans Berman; Kurt Kelman

[57] ABSTRACT

Pullulan reacts with alkylating agents such as dimethyl sulfate, diethyl sulfate, ethylene oxide, and propylene oxide to form the corresponding lower-alkyl or hydroxy-lower-alkyl ethers which are much less soluble in water than pullulan, but retain sufficient sensitivity to moisture to be biodegradable when they do not contain more than one, and preferably not more than 0.5, alkoxy or hydroxyalkoxy group per glucose unit in the pullulan molecule. Films and fibers of the ethers are mechanically strong and are readily plasticised with water-soluble polyhydric alcohols. The ethers can be molded above their softening temperature in conventional injection or compression molding equipment. The films are practically impervious to atmospheric oxygen and suitable as packaging material.

10 Claims, No Drawings

SHAPED SOLID BODY OF PULLULAN ETHER AND METHODS OF MAKING AND USING THE SAME

This invention relates to derivatives of pullulan, and particularly to shaped solid bodies essentially consisting of such derivatives, and to methods of making and using the bodies.

Pullulan, a carbohydrate, is produced by microorganisms such as Pullularia pullulans in conventional culture media, as described in more detail in our copending application Ser. No. 425,151, filed on Dec. 12, 1973. It readily dissolves in water, and pullulan, regardless of other desirable properties, cannot be employed in moist environments when it is intended to remain solid.

It has now been found that the solubility of pullulan in water can be avoided, while retaining valuable properties, by converting the compounds to its lower-alkyl and hydroxy-lower-alkyl ethers in a reaction with conventional alkylating agents such as methyl and ethyl sulfate, ethylene oxide, and propylene oxide in alkaline aqueous solutions. The ethers are readily made into shaped solid bodies, as will be described hereinbelow in more detail, and the bodies can be plasticized with amounts of water-soluble polyhydric alcohols much smaller than those required for giving a comparable degree of flexibility and resilience to bodies of pullulan or of pullulan esters so that the bodies of pullulan ether have greater mechanical strength at equal flexibility and resilience.

The pullulan ethers of the invention still have sufficient moisture sensitivity to be biodegradable and to slowly disintegrate and/or dissolve in water if they do not contain more than one alkoxy or hydroxyalkoxy group per glucose unit in the pullulan molecule, an upper limit of 0.5 alkoxy or hydroxyalkoxy being preferred under many conditions. The ethers are as nontoxic as the unsubstituted pullulan and may safely be ingested. They decompose at temperatures above 200°C, but do not release toxic or noxious gaseous decomposition products.

Even extremely thin layers of the pullulan ethers of the invention are practically impervious to atmospheric oxygen so that objects sensitive to oxygen are protected when sealed in adhering coatings or loose envelopes of pullulan ethers.

The lower alkyl ethers having up to 4 carbon atoms in the alkyl group there are readily prepared by gradually adding the corresponding neutral alkyl sulfates to aqueous, alkaline solutions of pullulan. The hydroxy-lower-alkyl pullulan ethers, which are even superior in the mechanical properties of the shaped bodies prepared therefrom, are readily produced by gradually adding liquid alkylene oxides to aqueous, alkaline pullulan solutions or by introducing the alkylene oxides in the gaseous state into the solutions. The reaction temperature is not critical within the decomposition limits of the reactants, but the temperature has the expected effect on the reaction rate.

The water solubility of the ethers decreases with increasing degree of substitution, the term being employed herein to designate the number of alkoxy or hydroxyalkoxy groups per glucose unit which replace original hydroxyl groups. Ethers having a low degree of substitution are quite soluble in moderately hot water, and are precipitated from their aqueous solutions by water-miscible, organic non-solvents, such as alcohols.

Shaped bodies of pullulan ethers according to the invention are sufficiently hydrophilic to have an approximate water content of 5% in equilibrium with ambient atmosphere, but this water content does not change greatly with changes in the relative humidity of the atmosphere. They do not become sticky at 90% R.H., nor do they become brittle at R.H. values below 30%. They soften with increasing temperature until they reach their decomposition temperatures at above 200°C. They are not fusible, but they can be deformed plastically under heat and pressure.

Such plasticity is enhanced by small amounts of watersoluble polyhydric alcohols such as glycerol, ethyleneglycol, maltitol, and sorbitol, a group in which sorbitol is the least soluble member. Other water-soluble polyhydric alcohols, less readily available or more costly, are equally effective. Simple shapes, such as dishes, plates, bowls, and cups can be compression molded from unplasticized pullulan ethers, but moldability improves with plasticizer content up to about 5%. The optimum molding temperature varies between 180° and 100°C according to the amount of plasticizer present. The pullulan ethers of the invention can also be injection-molded if plasticized.

Films, 0.01 – 0.2 mm thick, are readily prepared from aqueous pullulan hydroxyalkyl ether solutions poured on heated rollers or stationary smooth substrates, and preferably dried by streams of hot air. The solutions may contain 5% to 15% pullulan ether, but other concentrations may be employed with suitable equipment and methods.

The films typically have tensile strengths of 3 to 5 $kg/mm^2$, and fail in folding endurance tests only after 200 to 900 cycles. They are colorless and transparent, and practically impermeable to the normally gaseous components of air, particularly oxygen.

Fibers are prepared readily in a conventional manner by spinning of aqueous dopes containing 30% to 50% pullulan hydroxylower-alkyl ether at typical temperatures of 90° to 120°C, and by evaporation of the water from the extruded fibers into hot, dry air. The tensile strength of the fibers is greatly improved by stretching the extruded fibers during the drying operation.

Coatings of pullulan ethers may be prepared from applied layers of aqueous solutions, preferably containing 5% to 10% ether of a degree of substitution smaller than 0.5. They have been used to advantage on foods, pharmaceuticals, and metals which were sprayed with or dipped in the ether solutions.

When the coatings are required to have outstanding flexibility, resiliency, and softness, the coating solutions should contain 2% to 4% of a polyhydric alcohol, such as glycerol, and the wet film should be dried at the lowest temperature consistent with the required rate of production. The coatings are free from pin holes. When the coatings are applied to food or pharmaceuticals, they need not be removed prior to ingestion since the ethers dissolve and are sufficiently decomposed in the digestive tract.

Some typical applications of the pullulan ethers of the invention will be described hereinbelow, but others will readily suggest themselves to those skilled in the art, and it will be understood that the following Examples are merely illustrative.

EXAMPLE 1

900 g Pullulan having a molecular weight of 200,000 was dissolved in 3,500 ml of aqueous 5% sodium hydroxide solution. The solution was de-gassed and 150 ml propylene oxide was added gradually during a period of 5 hours while the solution was kept at 40°C under a nitrogen blanket. The reaction mixture was neutralized with acetic acid, and enough methanol was added to precipitate pullulan hydroxypropyl ether which was recovered, washed with 90% methanol, and dried. The degree of substitution of the ether was 0.3.

The pullulan ether was mixed intimately with 3% glycerol and the mixture was compression-molded at 130°C to prepare plates. The plates, upon cooling, retained their initial shape, and were transparent and free from gas bubbles. When stored at 50% to 80% relative humidity and room temperature, they did not absorb moisture nor suffer a loss of hardness. When they were buried in moist soil for one month, they lost their shape and coherence.

When exposed to a flame, they deformed and turned brown, but did not release toxic gas.

EXAMPLE 2

Pullulan hydroxyethyl ether having a molecular weight of 300,000 and a degree of substitution of 0.5 was produced in the manner of Example 1 using ethylene oxide which was added to an aqueous pullulan solution as in the preceding Example. It was precipitated from the reaction mixture after cooling by adding methanol. The precipitate formed was collected, washed with aqueous methanol, and dried. The ether was dissolved in water at 50°C to produce a 15% aqueous solution. 2% Glycerol was added, based on the weight of the dissolved pullulan ether, and the homogeneous solution so obtained was spread on metal plates having a temperature of 50°C and then dried in a stream of air at 70°C. The films stripped from the metal supports were stored in an incubator to equilibrium with air of 50% relative humidity and 30°C. They were then found to have a moisture content of 5.1% and to have a pleasant, soft feel. They had the following additional properties:

| | |
|---|---|
| Tensile strength | 4.8 kg/mm$^2$ |
| Elongation | 18% |
| Folding endurance | 900 cycles |
| Oxygen permeability | 0.50 cm$^3$/m$^2$/24 hrs. at 29°C |
| Absorbance at 450 nm | 0.02/0.1 mm film thickness |

The films were glossy and smooth, and could be easily heat-sealed in conventional equipment. When immersed in warm water, they dissolved gradually.

EXAMPLE 3

An aqueous 8% solution of pullulan hydroxyethyl ether was prepared in the manner described in Example 2. The tips of capsule-forming rods were coated with the solution, and the coatings were dried in a stream of air at 30°C. The capsules so formed were substantially free of deformation, and they were colorless, transparent and highly resilient. Colored and opaque capsules were readily prepared in the same manner from coating compositions which contained dyes and/or pigments.

EXAMPLE 4

The pullulan hydroxypropyl ether prepared by the procedure of Example 1 was mixed with enough water to produce a dope of 15% solids which was fed to a spinnerette. Transparent, flexible, resilient fibers free from air bubbles and having high tensile strength were obtained by spinning the ether composition at a draw ratio of 3 from the nozzle, which was maintained at 140°C, into a stream of air at 90°C.

EXAMPLE 5

Pullulan hydroxypropyl ether having a molecular weight of 350,000 and a degree of substitution of 0.2 was dissolved in water at 60°C, as described in Example 1 to produce an aqueous 12% ether solution. Fresh eggs were coated with a uniform film of the ether solution by repeated spraying, and the coating formed was dried. The coated eggs were stored 180 days at 20°C, and were thereafter still found to be edible, showing little deterioration. The coating procedure extended the storage life of eggs by a factor of 6 to 8 as compared to uncoated controls.

EXAMPLE 6

The pullulan hydroxypropyl ether referred to in Example 5 was mixed with 5% glycerol, and the mixture was dissolved in warm water to produce a solution having a solids content of 15%. Flexible films, 0.1 mm thick, were produced by coating clean, polished metal plates with the solution, and drying the wet coating at 70°C. Two layers of the films so obtained were placed on top of each other and the space between the films was filled with vitamin A oil. The laminar structure was compressed between heated platens to displace the oil along ridges of the platens and heat-seal the two films to each other, thereby separating individual doses of the oil and producing spherical capsules which could then be severed from each other. The vitamin did not show any loss of quality during prolonged storage due to the impermeability of the enveloping film to atmospheric oxygen.

The lower alkyl ethers of pullulan are similar to the preferred hydroxyalkyl ethers more specifically referred to in the Examples. They are prepared in a conventional manner and may be utilized in the same way as specifically described with reference to the hydroxyethyl and hydroxypropyl ethers.

Concerning the minimum degree of substitution of the pullulan ethers of the invention, at least one thousandth of the available hydroxyl groups in the pullulan molecule is replaced preferably by alkoxy or hydroalkoxy groups.

The molecular weight of pullulan ranges usually from 10,000 to 5,000,000 and can be varied by varying culture conditions. Although pullulan of any molecular weight is suitable as the starting material for the pullulan ethers of the invention, pullulan having a molecular weight of 50,000 to 1,000,000 is most convenient for the preparation of pullulan ethers.

What is claimed is:

1. A shaped, solid body essentially consisting of a lower-alkyl or hydroxy-lower-alkyl ether of pullulan and 0% to 5% of a polyhydric alcohol at least as soluble in water as sorbitol, said lower-alkyl having one to four carbon atoms, and said pullulan having a molecular weight of 10,000 to 5,000,000.

2. A body as set forth in claim 1, wherein alkyl and hydroxyalkyl has up to 3 carbon atoms, said ether containing up to 0.5 alkoxy or hydroxyalkoxy group per glucose unit in the molecule of pullulan.

3. A body as set forth in claim 2, wherein said polyhydric alcohol is glycerol, ethyleneglycol, sorbitol, or maltitol.

4. A body as set forth in claim 3 essentially consisting of said hydroxy-lower-alkyl ether and said 0% to 5% of said polyhydric alcohol.

5. A method of making a body as set forth in claim 1 which comprises shaping a material essentially consisting of said lower-alkyl or hydroxy-lower-alkyl ether of pullulan containing not more than one alkoxy or hydroxyalkoxy group per glucose unit in the pullulan molecule and of 0% to 5% of a polyhydric alcohol soluble in water under pressure and at a temperature above the softening temperature of said material.

6. A method as set forth in claim 5, wherein said material essentially consists of said hydroxy-lower-alkyl ether and of said 0% to 5% of said polyhydric alcohol.

7. A method of making a body as set forth in claim 1 which comprises a. preparing an aqueous solution of said lower-alkyl or hydroxy-lower-alkyl ether of pullulan containing not more than one alkoxy or hydroxyalkoxy group per glucose unit in the pullulan molecule and of 0% to 5% of a polyhydric alcohol soluble in water;

b. imparting a shape to the prepared solution; and c. removing enough water from the shaped solution to make the residue shape-retaining.

8. A method as set forth in claim 7, wherein said aqueous solution essentially consists of water, said hydroxy-lower-alkyl ether, and said 0% to 5% of a polyhydric alcohol.

9. A method of protecting an object from oxidation by atmospheric oxygen which comprises sealing said object in an envelope of the body set forth in claim 1.

10. A method as set forth in claim 9, wherein said body essentially consists of said hydroxy-lower-alkyl ether and said 0% to 5% of said polyhydric alcohol.

* * * * *

UNITED STATES PATENT AND TRADEMARK OFFICE
CERTIFICATE OF CORRECTION

PATENT NO. : 3,870,537
DATED : March 11, 1975
INVENTOR(S) : HIROMI HIJIYA ET AL

It is certified that error appears in the above-identified patent and that said Letters Patent are hereby corrected as shown below:

In column 1, line 10, change "425,151" to -- 424,151 --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*